(No Model.)
S. A. BEMIS.
CAR SPRING.
No. 284,713. Patented Sept. 11, 1883.
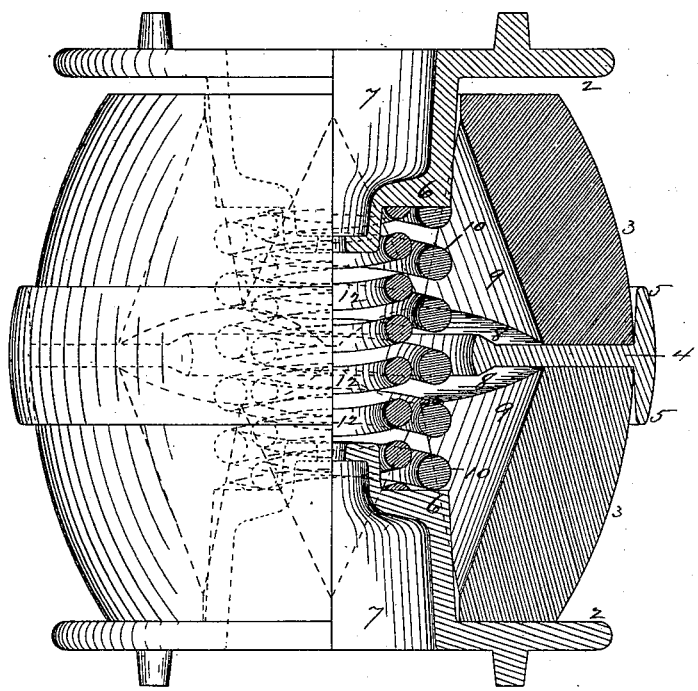
Fig. II
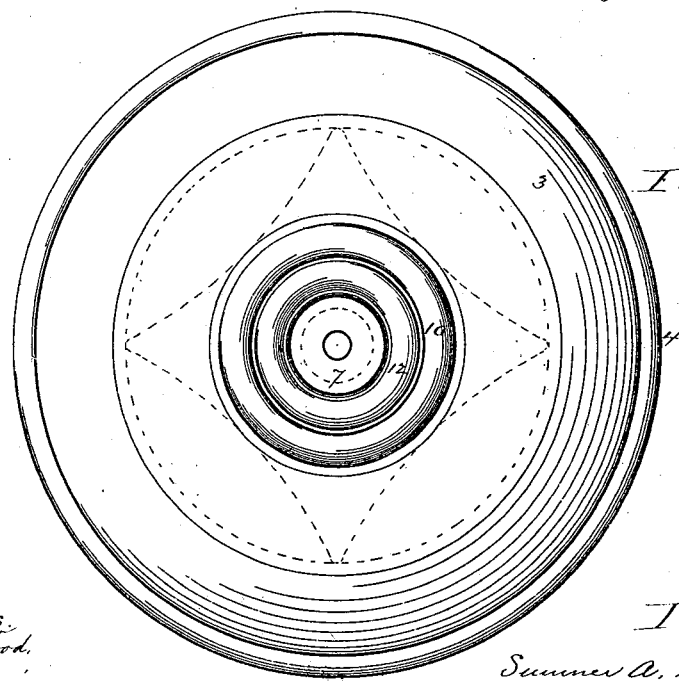
Fig. I
Witnesses.
Chas. H. Wood.
E. E. Curtis.
Inventor.
Sumner A. Bemis.
By T. A. Curtis,
his Atty.

UNITED STATES PATENT OFFICE.

SUMNER A. BEMIS, OF SPRINGFIELD, MASSACHUSETTS.

CAR-SPRING.

SPECIFICATION forming part of Letters Patent No. 284,713, dated September 11, 1883.

Application filed June 14, 1883. (No model.)

*To all whom it may concern:*

Be it known that I, SUMNER A. BEMIS, of Springfield, in the county of Hampden and State of Massachusetts, have invented a new and useful Improvement in Railway-Car Springs, of which the following is a description and specification.

The object of my invention is to provide a cheap, effective, and durable railway-car spring, having parts of the same interchangeable, and I accomplish this by the mechanism substantially as hereinafter described, and illustrated in the accompanying drawings, in which—

Figure I is a plan view of my invention with the top plate removed, and Fig. II is a half vertical section at the axis and a half side elevation of the same.

In the drawings, 2 represents the upper and lower end or bearing plates, made in duplicate, each provided with a central internal flange, 7, and a shoulder, 6, more or less remote from the plate. The rubber springs 3, of which there are two, are placed with their larger ends adjacent to each other, with a flanged plate, 4, placed between them, one of the ends of each spring bearing against a plate, 2, and the other abutting against the plate 4, placed between them. Each rubber spring has a central hole therein to receive the central flange, 7, of the plate 2, and the end of each spring which abuts against the plate 4 is provided with a cavity, 8, and each spring is provided with internal side cavities or corrugations, 9, extending out from the central hole, as shown in dotted lines in Fig. I, and as shown in Fig. II. One or more spiral steel springs, 10, are placed within the central hole through the rubber springs, and having a bearing at each end against the shoulder 6 on each plate 2. If two spiral springs are used, one may be placed within the other, as shown clearly in Fig. II, and I prefer that one should be coiled in one direction and the other in the other direction.

The car-springs, as thus constructed of rubber and metal, may be secured to the car in the ordinary manner, with a bolt or rod extending through the hole at the center of each plate 2 and through the spiral springs. When the weight of the car is thrown upon the springs, the tendency is for the smaller end of each rubber spring 3 to be drawn in toward the center of each plate 2, while the tendency of the larger end of each rubber spring abutting against the plate 4 is to be forced outward. The flange 5 or said plate 4, however, receives the outward thrust of that end of the rubber spring, and the mass of rubber of each spring 3 is forced toward the end cavity, 8, so that the spring retains its general form, and is very substantial and strong to support the load.

This spring possesses advantages in this, that the parts may all be made in duplicate, so that should one part become more worn than its duplicate on account of position, or for other reasons, the parts may be changed as to their places, and one part may be easily replaced with another without deranging the general construction of the spring.

Of course a single spiral steel spring may be used instead of two in cases where a light spring is required, and yet retain all the advantages of the rubber springs.

Having thus described my invention, what I claim as new is—

The combination of two rubber springs provided with a central hole, bearing-plates at each end thereof, and one or more metal spiral springs inserted in said central hole, and whose ends have a bearing against said plates, substantially as described.

SUMNER A. BEMIS.

Witnesses:
T. A. CURTIS,
CHAS. H. WOOD.